United States Patent
Deppe-Reibold

(10) Patent No.: US 8,842,286 B2
(45) Date of Patent: Sep. 23, 2014

(54) SUPPRESSION OF QUANTIZATION NOISE IN A FIBER-OPTIC SAGNAC INTERFEROMETER

(75) Inventor: Olaf Deppe-Reibold, Emmendingen (DE)

(73) Assignee: Northrop Grumman LITEF GmbH, Freiburg (DE)

( * ) Notice: Subject to any disclaimer, the term of this patent is extended or adjusted under 35 U.S.C. 154(b) by 337 days.

(21) Appl. No.: 13/506,468

(22) Filed: Apr. 20, 2012

(65) Prior Publication Data

US 2013/0215430 A1    Aug. 22, 2013

(30) Foreign Application Priority Data

Apr. 21, 2011    (DE) .................... 10 2011 018 468

(51) Int. Cl.
*G01C 19/72*    (2006.01)
(52) U.S. Cl.
CPC .............. *G01C 19/721* (2013.01); *G01C 19/72* (2013.01)
USPC ........................................ 356/460

(58) Field of Classification Search
CPC ....... G01C 19/64; G01C 19/72; G01C 19/726
USPC ........................................... 356/460
See application file for complete search history.

(56) References Cited

U.S. PATENT DOCUMENTS

| 5,113,127 A * | 5/1992 | Hoffman et al. ............. 320/110 |
| 5,351,123 A * | 9/1994 | Spahlinger ................... 356/464 |
| 2010/0026535 A1 | 2/2010 | Keith | |

* cited by examiner

*Primary Examiner* — Jonathan Hansen
(74) *Attorney, Agent, or Firm* — Elliott N. Kramsky

(57) ABSTRACT

In the case of a fiber-optic Sagnac interferometer, the output of an analog/digital converter and thus output signals processed in a main control circuit as well as a phase resetting signal for a phase modulation encompass a first word width. An input of a digital/analog converter and thus a resetting signal, which acts on the phase modulator, encompasses a second word width, which is smaller than the word width, with which the resetting and modulation signal is computed. A residual value signal comprising a third word width, which can be added to the output signal of the analog/digital converter via an adder, is obtained from the surplus, low-value bits.

13 Claims, 2 Drawing Sheets

SUPPRESSION OF QUANTIZATION NOISE IN A FIBER-OPTIC SAGNAC INTERFEROMETER

BACKGROUND

1. Field of the Invention

The present invention relates to fiber-optic Sagnac interferometers. More particularly, the invention pertains to a Sagnac interferometer and a method for controlling a Sagnac interferometer.

2. Description of the Prior Art

Fiber-optic Sagnac interferometers are routinely employed in aircraft and water craft. Their use in land craft is also possible. Such devices offer autonomous determination of position in space, allowing accurate vehicle position determination when the speed is known without requiring external data (e.g. a GPS signal or satellite communication).

Fiber-optic Sagnac interferometers are generally integral parts of inertial navigation systems for determining the position or rotary motion of objects in space. Such determination is based on the association of rotation rates and accelerations acting on an object with reference to the three spatial axes of the inertial navigation system. With knowledge of rotation rates and accelerations that act on an object for a certain period of time, accurate determination of the position of the object relative to initial position is possible. When initial position is precisely known, the current absolute position of the object in space can also be determined.

Inertial navigation systems for detection of rotation rates and accelerations acting on an object for position determination are versatile. Optical, rather than mechanical effects can be employed. Such an optical system can be based on at least one fiber-optic Sagnac interferometer that employs the Sagnac effect, in which a phase difference occurs in response to a rotation between two light waves that counterrotate in a fiber-optic light guide loop. When observing the two countercirculating light waves upon emergence from the fiber-optic loop, an intensity change becomes visible that can be described by an interferometer characteristic curve. The curve defines the intensity change as a function of the phase difference between the two light waves.

A Sagnac interferometer is preferably provided for rotation of an object about each of the three spatial axes, so that a corresponding inertial system includes three Sagnac interferometers, the rotation-sensitive axes of which are orthogonal to one another. Rotation about an axis that does not coincide with one of the spatial axes, can, of course be, detected via corresponding components measured at two or three Sagnac interferometers.

The phase shift in a fiber-optic Sagnac interferometer is directly proportional to rotation speed, the length of the light path in the fiber-optic light guide loop or coil, and the diameter of the light path. Phase shift is also inversely proportional to the wavelength of the light employed.

The interferometer characteristic curve, mentioned above, that describes the dependency of the light intensity (which serves as observation variable for determining rotation) on phase difference is cosine-shaped. As a corresponding transfer function at the maximum of the cosine curve is insensitive to small inputs and the algebraic sign of the phase shift, that corresponds to the direction of rotation cannot be determined, an operating point, of the Sagnac interferometer is often shifted to lie at the point of maximum gradient of the cosine function. Sine or square-wave modulations, for example, are suitable for this purpose. Maximum sensitivity of the interferometer is thereby obtained in response to a small rotary motion.

Noise due to limited quantization ability, also called quantization noise, results from processing by the digital/analog converter. Such quantization noise can interfere with accurate rotation rate measurement.

A fiber-optic Sagnac interferometer, in which signals of an analog/digital converter are divided into MSB (most significant bit) or LSB (least significant bit) parts, is taught in published United States patent application 2010/0026535 A1 of Gregg Keith entitled "Segmented Optics Circuit Drive For Closed Loop Fiber Optic Sensors". Parallel digital/analog converters convert 23 bits of divided MSB/LSB data into analog signals, that are combined to control an integrated optical chip. An amplifier circuit outputs MSB and LSB signals that are output to an amplifier, where they are combined into an analog signal having 23 bit precision.

SUMMARY AND OBJECTS OF THE INVENTION

It is an object of the invention to provide a fiber-optic Sagnac interferometer in which noise due to quantization by a digital/analog converter is effectively minimized.

Another object is to provide a fiber-optic Sagnac interferometer according to the preceding object in which highly accurate rotation rate measurements can be carried out at even very low rotation rates.

The foregoing and other objects are addressed by the present invention that provides, in one aspect, a fiber-optic Sagnac interferometer. It includes a light source, a polarizer, a fiber coil, a photodetector device, an amplifier comprising an analog/digital converter connected downstream, a digital/analog converter, an evaluation circuit, an adder and a phase modulator. Two light beams that originate from the light source and are polarized by the polarizer are created by means of beam splitting. They can be irradiated into the fiber coil in opposite directions and subsequently recombined and modulated by the phase modulator arranged in the fiber coil. The interference signal, created from recombination of the light beams, can be applied to the photodetector device. A signal within the device corresponds to the light intensity of the interference signal. It can be applied to the amplifier that comprises the analog/digital converter connected downstream whose output signals can be processed in the evaluation circuit. The signal can be supplied by means of the photodetector device wherein a digital phase resetting signal can be created with the help of a main control circuit of the evaluation circuit. Such signal can be supplied to the digital/analog converter for obtaining a resetting signal that acts on the phase modulator.

The interferometer is characterized in that the analog/digital converter is embodied such that the output thereof and, thus, the output signals processed in the main control circuit, as well as the phase resetting signal, encompass a first word width. The digital/analog converter is embodied such that the input thereof and, thus, the resetting signal that acts on the phase modulator, encompasses a second word width that is smaller than that of the word with which the modulation and resetting signal are computed in the digital part of the main control circuit. A residual value signal comprising a third word width can be created that can be added to the output of the analog/digital converter via the adder, such signal consisting of the surplus, low-value bits of the signal comprising the second word width.

In another aspect, the invention provides a method for controlling a fiber-optic Sagnac interferometer of the type that comprises a light source, a polarizer, a fiber coil, a photodetector device, an amplifier comprising an analog/digital converter connected downstream, a digital/analog converter, an evaluation circuit and an adder. In such an interferometer, two light beams, which originate from the light source polarized by the polarizer and created by means of beamsplitting, are irradiated into the fiber coil in opposite directions and are subsequently recombined. The interference signal, created from the recombination of the light beams, is applied to the photodetector device after passing through the polarizer, wherein a signal, which corresponds to the light intensity of the interference signal and is applied to the amplifier comprising the analog/digital converter connected downstream whose output signals are processed in the evaluation circuit, supplied by means of the photodetector device. A digital phase resetting signal is created with the help of a main control circuit of the evaluation circuit and supplied to the digital/analog converter to obtain a resetting signal that acts on the phase modulator.

The method is characterized in that the output of the analog/digital converter and, thus, the output signals, which are processed in the main control circuit, as well as the phase resetting signal, encompass a first word width. The input of the digital/analog converter and, thus, the resetting signal that acts on the phase modulator, encompasses a second word width, smaller than the word width with which the modulation and resetting signal are computed in the digital part of the main control circuit. A residual value signal is created comprising a third word width, which can be added via the adder to the output signal of the analog/digital converter. The third word width corresponds to the number of the surplus low-value bits computed by the evaluation circuit, which cannot be applied to the digital/analog converter, because it only encompasses a limited, smaller word width.

The preceding and other features of the invention will become apparent from the detailed description that follows. Such description is accompanied by a set of drawing figures. Numerals of the drawing figures correspond to those of the written description with like numerals referring to like features of the invention throughout.

DETAILED DESCRIPTION OF THE PREFERRED EMBODIMENT

Figure 1:
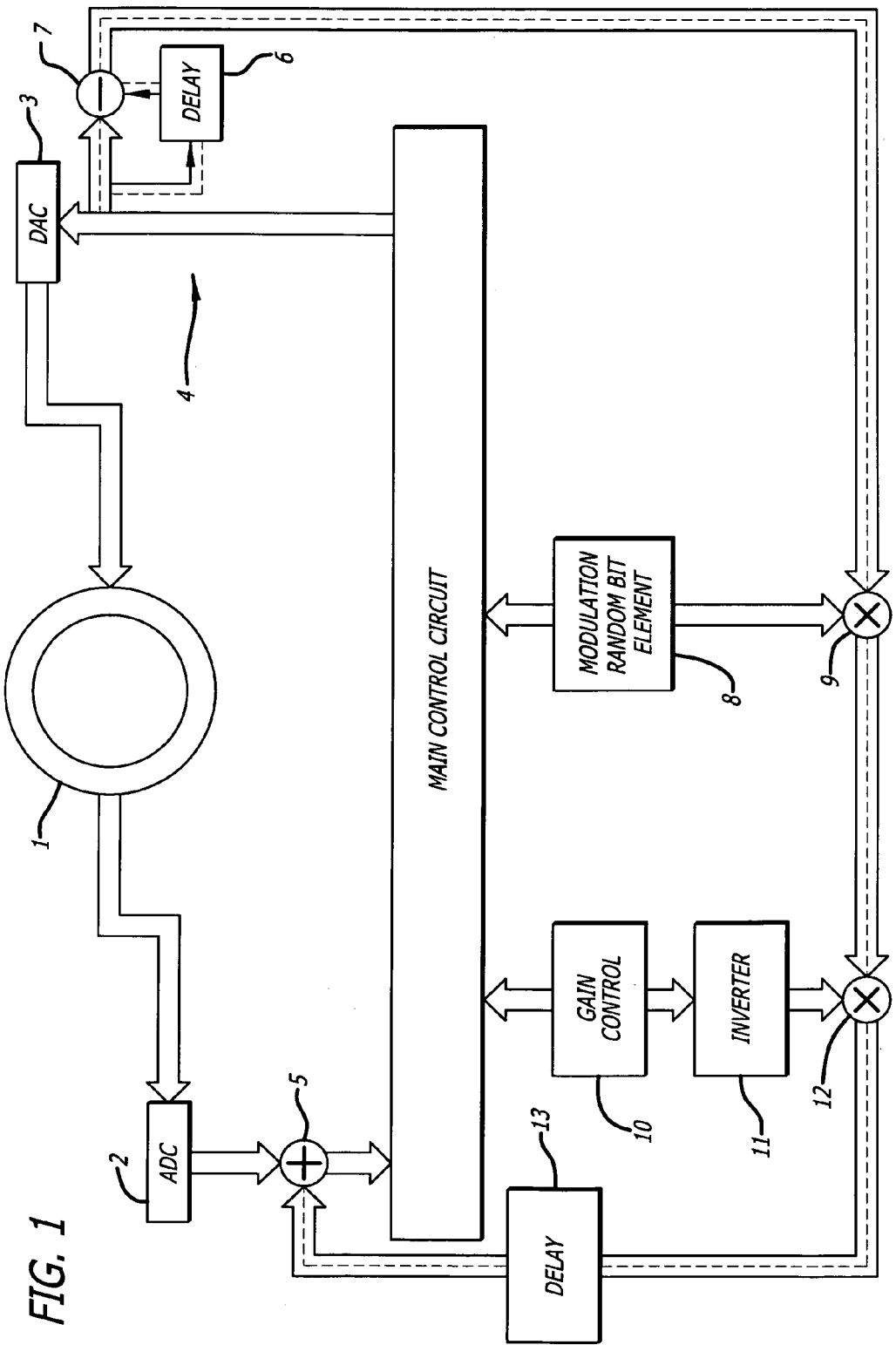
FIGS. 1 and 2 are alternative illustrations of a control circuit that can be used in a fiber-optic Sagnac interferometer according to the invention.

A fiber-optic Sagnac interferometer according to the invention encompasses a light source, a polarizer, a fiber coil, a photodetector device, an amplifier comprising an analog/digital converter connected downstream, a digital/analog converter, an evaluation circuit, an adder and a phase modulator. Fiber-optic ring interferometer, for example, is synonymous with fiber-optic Sagnac interferometer. The light source is preferably able to emit light at a wavelength that can be determined. Slight phase shifts are to be determined. A so-called superluminescent diode (SLD) is often used as the light source for a fiber-optic Sagnac interferometer as it possesses a higher optical bandwidth than a laser light source and, accordingly, a shorter coherence length. The advantage of a smaller coherence length (typically 25 μm), is the incoherence between the useful signal and other light signals that are created at reflection or scatter locations.

The polarizer is suitable to polarize the light of the light source. The fiber coil corresponds to an above-mentioned fiber-optic light guide coil and substantially consists of an optical fiber that is wound to form a coil. The optical fiber can be a micro-structured fiber or a group of microstructured fibers consisting completely or only partially of a light-guiding material. The photodetector device converts incident light into electrical signals, so that they contain information relating to light intensity, wavelength, an interference or an interference signal, or chase shift. The phase modulator is arranged upstream of the fiber coil and is suitable to modulate the phase of a light beam.

Two beams, which originate from the light source, polarized by the polarizer and created by means of beamsplitting, can be irradiated into the fiber coil in opposite directions and subsequently recombined. Arrangements comprising mirrors or half-mirrors, for example, can be used. A light beam emerges from the light source, is divided and two light beams stemming from the light source are consequently provided, which, in turn, are irradiated opposite to one another into the fiber coil. As a rule, the entire design and, in particular, the beamsplitting and combining, as well as phase modulation, is realized, however, by means of integrated optical components. The two light beams coming from the light source can be modulated independent of one another by means of the phase modulator located in the fiber coil. The phase of one or both of the light beams can thus be changed by means of the phase modulator, corresponding to a phase shift of the two light beams relative to one another.

The interference signal, created by recombination of the light beams, can be applied to the photodetector device, wherein a signal, which corresponds to the light intensity of the interference signal, can be supplied by means of the photodetector device. This signal can be applied to the amplifier comprising the analog/digital converter which is connected downstream. The output signals of the analog/digital converter can be processed in the evaluation circuit.

A digital phase resetting signal can be created by a main control circuit of the evaluation circuit and can be supplied to the digital/analog converter to obtain a resetting signal that acts on the phase modulator. As described above, a phase shift of the two light beams can be carried out in the fiber coil by means of the phase modulator. Typically, it is desired that the phase modulator adjusts the phase shift of the two light beams such that the operating point on the cosine-shaped interferometer characteristic curve is always half of the maximum intensity and thus at a point of a maximum gradient of this characteristic curve. To continually adjust a corresponding phase shift even in response to a rotary motion of the interferometer, the resetting signal is arranged to act on the phase modulator. This resetting signal also simultaneously specifies the degree of rotary motion and is in turn, created on the basis of the signal of the photodetector device, which can be applied to the amplifier comprising the analog/digital converter connected downstream.

For a better general understanding, the above-specified technology will once again be explained in a different manner. All of the light beams or light signals, respectively, within the fiber coil exist in the analog domain. Processing of modulation signals and signals of the photodetector device or of the main control circuit takes place in the evaluation circuit, in the digital domain. To obtain the resetting signal relevant for phase modulation, a modulation signal is created in the evaluation circuit. After conversion by means of the digital/analog converter, this modulation signal, as the resetting signal, controls the phase modulator, and thus, more simply, "the gyroscope". Also, more simply, the resetting signal, as output signal of the digital/analog converter, is processed through the analog domain of the interferometer arrangement or the path of the gyroscope in an analog form and then reaches the input of a demodulator as a signal, which is proportional to the received light intensity of the combination of the two light beams.

Figure 2:
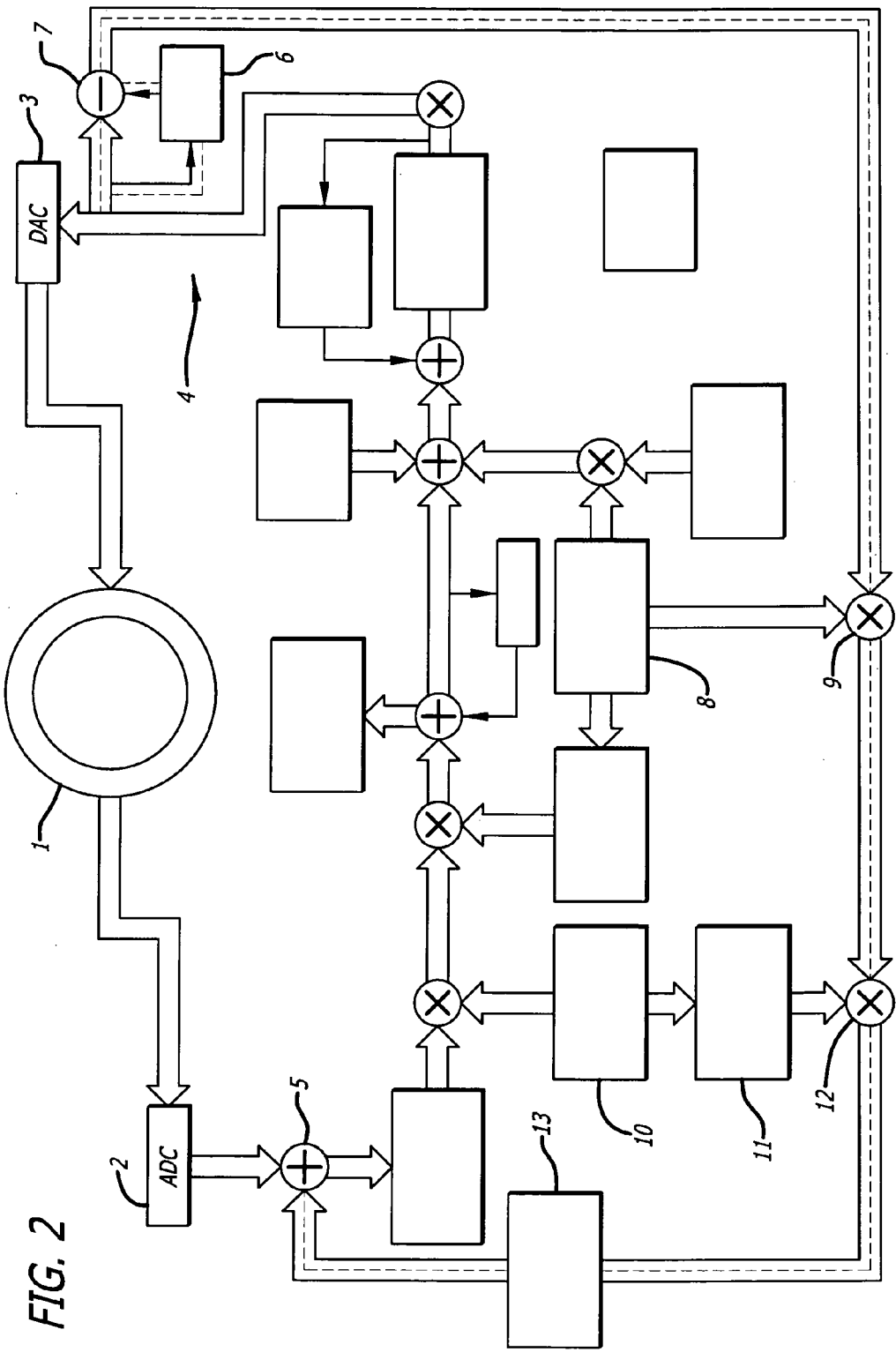

FIGS. 1 and 2 illustrate, in alternative views, a control circuit that can be used for a fiber-optic Sagnac interferometer in accordance with the invention. Components or signal processing helpful for a better understanding and for explaining a practical implementation, but not absolutely necessary for implementing the invention, are also illustrated.

A fiber coil 1 of a Sagnac interferometer is symbolically illustrated. (The Sagnac interferometer further encompasses a light source and a polarizer, not shown.) Light beams running in and, thus, signals passing through, the fiber coil 1, exist in the analog domain. To carry out adequate signal processing for desired phase modulation in the fiber coil 1, signal processing is carried out in an evaluation circuit in the digital domain. Accordingly, the light or signal output of the fiber coil 1 is supplied to an analog/digital converter (ADC) 2. The signal output of a digital/analog converter (DAC) 3 is supplied to the modulator in the fiber coil 1.

Two light beams, which or from the light source, polarized by the polarizer and created by means of beamsplitting, can be irradiated into the fiber coil 1 in opposite directions and subsequently recombined. The two light beams can be modulated by a phase modulator arranged in the fiber coil 1 (not illustrated). The phase modulator is able to effect a phase shift of the two light beams, which counterpropagate in the fiber coil 1 by a reset signal.

For this, the interference signal, created by recombination of the light, beams, can be applied to the photodetector device, wherein, a signal, which corresponds to the intensity of the interference signal can be applied to the amplifier comprising the analog/digital converter connected downstream. The amplifier output signals, which can be processed in the evaluation circuit, can be supplied by the photodetector device. A digital phase resetting signal can then be created with the help of a main control circuit of the evaluation circuit and supplied to the digital/analog converter 3 to obtain the resetting signal that acts on the phase modulator.

The output of the analog/digital converter 2 and, thus, the output signals processed in the main control circuit, as well as the phase resetting signal, comprise a first word width. The input of the digital/analog converter 3 and, thus, the resetting signal that acts on the phase modulator, comprises a second word width, which is smaller than the word width with which the modulation and resetting signal are computed in the digital part of the main control circuit. This is confirmed in that the input of the digital/analog converter 3 only allows signals comprising the second word width. The remainder of low-value-value hits is formed by signals comprising a third word width. The signals comprising the third word width are characterized in FIG. 1 by means of dashes. Arrow 4 also shows the location in the control circuit that the signal comprising the third word width is branched off, so that the completely manageable signal comprising the second word width can be applied at the input to the digital/analog converter 3. The signal path, which is identified by means of dashes, and the corresponding signal processing can be identified as an auxiliary control circuit, which, together with the remaining control circuit or the corresponding signal processing, respectively, as main control circuit forms the evaluation circuit.

The signals comprising the third word width, which represent the surplus of bits, form at least one residual value signal. This signal can be added to the output of the analog/digital converter 2 via an adder 5.

As already shown, the residual value signal can be created solely from the surplus of bits of the signal comprising the first word width relative to the input signal of the digital/analog converter comprising the second word width.

The control circuit of FIGS. 1 and 2 and, thus, also, the entire underlying evaluation circuit comprising the main and auxiliary control circuits, operate in work cycles that are predetermined by a clock-pulse generator. It is thus possible for a residual value signal of a first work cycle and a further residual value signal of a further work cycle to be created and for the difference to be formed between the two residual value signals. This is shown by the control element 6, which supplies a residual value signal of a work cycle that precedes a current work cycle, and the subtractor 7. The residual value difference can be considered a type of residual value signal that corresponds to a phase error in response to the modulation. To compensate for this phase error, the output of the analog/digital converter 3, in which the phase error is initially present in an uncorrected manner, is changed to a corresponding corrected signal. The algebraic sign of the amplification is a function of the modulation bit of the current work cycle. The modulation bit determines whether the modulation signal, which corresponds to a phase deviation of $\pi/2$ and which is required to control the points of a maximum gradient on the interferometer characteristic curve, will be added to the resetting signal with a positive or negative algebraic sign. The residual value signal in the form of the residual value difference comprising the modulation bit from the element 8 is thus multiplied at the multiplier 9. The signal from the residual value difference as residual value signal and the resulting modulation bit is identified as algebraic sign-corrected residual value signal.

The degree of amplification will be obtained by inversion of the amplification, control or gain control element 10 wherein the inverter 11 carries out the inversion and the multiplier 12 multiplies the inverted signal of the gain control element 10 with the algebraic sign-corrected residual value signal. The result of the multiplication is an amplified, algebraic sign-corrected, residual value signal. The amplified algebraic sign-corrected residual value signal passes through a delay element 12 that helps to compensate for dead times (which appear in the real system) due to signal running times that differ from one another for technical reasons.

The amplified algebraic sign-corrected residual value signal, which can also be understood as an amplified algebraic sign-corrected residual value difference, is finally added to the output signal of the analog/digital converter 2 at the adder 5 in its form, which compensates dead times.

As already shown, the output signal of the analog/digital converter 2 is thus present with the first word width, whereas the amplified algebraic sign-corrected residual value signal is present with the third word width. In response to the addition of the signals by the adder 5, however, the word width of the output signal of the analog/digital converter 5 does not change, but maintains the first word width. In response to the addition of the signals by the adder 5, however, the word width of the output signal of the analog/digital converter 2 does not change, hut maintains the first word width.

One residual value difference, which describes the degree of a phase error created by the quantization of the digital/analog converter 3 in response to the modulation, can always be determined in the manner described above from two work cycles and the corresponding information then directly used for compensating the measuring error in light intensity at the photodetector caused by the phase error. The information relating to light intensity includes the output values of the analog/digital converter. The correction is correspondingly applied to them.

The described residual value signal already corresponds to a phase error in response to the modulation. Due to the fact, however, that the operating point on the corresponding characteristic curve of the Sagnac interferometer is determined by the difference of two consecutive modulation signals, differentiation of the residual value signals leads to error in the detector signal with which the actual position of the operating point is currently measured. The stringing together of the differentiator, the algebraic sign correction, the amplification multiplication and the delay member can also be understood as an illustration of the interferometer, by means of which the effects of the quantization errors can be predicted, to then compensate this effect. The reproduction is thereby not applicable for all possible operating points, but for the concrete interferometer comprising its dimensioning and parameters, as are reflected in the reproduction, as it linearizes the characteristic interferometer curve in the area of the respective operating points at half of the maximum intensity.

According to the invention, the output of the analog/digital converter and, thus, the output signals, which are processed in the main control circuit, as well as the phase resetting signal, encompass a first word width. The input of the digital/analog converter and thus the modulation and resetting signal, which acts on the phase modulator, encompasses a second word width. The word width follows from the number of bits, which a digital signal encompasses, and thus corresponds to the number of positions, which the bits representing the digital signal can assume. A residual value signal comprising a third word width can be added to the output signal of the analog/digital converter, is additionally created. In particular, the digital/analog converter can only process signals comprising the second word width because its processing capacity and its signal input are accordingly limited. The portion of the signal, not processed by the digital/analog converter, thus encompasses the third word width and can be used directly as a residual value signal. In this respect, the residual value signal is created by further processing of the signal portion which is not processed by digital/analog converter.

The adder adds the residual value signal comprising the third word with to the output signal of the analog/digital converter. The latter output signal comprises the first word width, so that, in response to the addition of the residual value signal by the adder, the word width of the resulting signal, the output signal of the adder, does not change, but still corresponds to the first word width.

As mentioned above, noise, which is due to limited quantization ability, thus resolution of the converter, also called a Quantization noise, is generally created in response to signal processing of the digital/analog converter. This quantization noise impacts all of the signals, which are processed in the analog domain, and thus, in turn, impacts the signal processing in the digital domain, which follows the analog/digital converter, and thus also the rotation rate signal, which is to be output.

In other words, different signals comprising the third word width follow for different signals comprising the first word width, which are processed in the evaluation electronics. When observing signals comprising the third word width, in particular for different output signals comprising the first word width, information relating to the characteristics of the quantization noise can be determined, which, as residual signal, in turn, is incorporated into the signal processing of the signal comprising the first word width via the adder. The signal processing of the signal comprising the first word width is thus based, on the one hand, on the signal processing in the evaluation circuit and in the analog domain and, on the other hand, on information relating to the characteristics of the quantization noise, which is caused by the digital/analog converter. The residual value signal is thereby created such that, by being incorporated into the signal processing in the evaluation circuit or in the signal, which is processed there, respectively, comprising the first word width, the determined quantization noise is minimized and preferably completely compensated.

According to an embodiment of the invention, the evaluation circuit, the analog/digital converter and the digital/analog converter operate in work cycles predetermined and synchronized by means of a clock-pulse generator. This is a typical mode of operation of a digital circuit. However, according to this embodiment, the Sagnac interferometer encompasses a residual value difference computation section for computing a residual value difference between the residual value signal of a first work cycle and the residual value signal of a further work cycle. A residual value difference, which is created by means of the residual value difference computing section, can thus be established from the difference of two above-described residual or excess signals comprising the third word width with reference to the input of the digital/analog converter. Even though the residual value difference consists of a difference between two residual value signals, it can also be considered a residual value signal, because it is a signal, which can be created from surplus bits of signals comprising the first word width. The residual value difference provides an excellent opportunity to determine the quantization noise or, more accurately, the effect of it on the signal processing in the digital as well as in the analog domain. According to the invention, the residual value difference is considered to correspond to a phase error in response to the modulation. A phase error can thus be determined from the residual value difference.

The above-described resetting of the residual value signal or of the residual value difference can be combined as follows. A residual value signal comprising the third word width is created from surplus hits of a signal, in that the bit surplus, thus the signal portion of the signal comprising the low-value bits, which cannot be applied to the digital/analog converter and which thus encompasses the third word width, is used as the residual value signal and the difference of two consecutive work cycles is subsequently formed therefrom.

The presence of the residual value difference already represents information, based on which measures can be taken that reduce the quantization noise.

According to a further embodiment, the fiber-optic Sagnac interferometer encompasses a residual value difference storage unit for storing the residual value difference. This intermediate storage ensures that the correct analog/digital converter, thus the one, which is correlated to the digital/analog converter values, from which the residual value difference was created, in the chronological order of the modulation pattern.

According to a further embodiment, the fiber-optic Sagnac interferometer encompasses a first multiplier for multiplying the residual value difference with a modulation bit, which is created in the evaluation circuit. An error of the analog/digital converter, which corresponds to the phase error, can be determined in that the residual value difference with the amplification of the entire analog path, thus the signal processing in the analog domain of the "gyroscope", is measured. The algebraic sign of the amplification is thereby a function of the algebraic sign of the current modulation bit, so that the residual value difference is multiplied with it. An algebraic sign-corrected residual value signal can be created initially by means of the afore-mentioned first multiplication.

It is now possible to provide a second multiplier for multiplying the algebraic sign-corrected residual value signal with an amount of an amplification signal of an amplification control element of the evaluation circuit. This corresponds to the above-mentioned measuring of the residual value difference with the amplification of the analog path. An amplified algebraic sign-corrected residual value signal can thus be created from the algebraic sign-corrected residual value signal.

According to a fiber-optic Sagnac interferometer according to a further embodiment, the amount of the amplification signal can be created by inverting an output signal of the amplification control element. The amplification control element causes an adjustment of the amplification of the entire control loop, so that the value is always one. The product from the entire analog amplification and the amplification control element is thus one.

According to a further embodiment, the fiber-optic Sagnac interferometer encompasses a residual difference adder for adding the output of the analog/digital converter with the amplified algebraic sign-corrected residual value signal, so that the signal output of the adder can be processed in the main control circuit. The signal processing in the main control circuit thus relates to the actual output signal of the analog/digital converter, which is subjected individually to the current phase error caused by a quantization noise and additionally to the added amplified and algebraic sign-corrected residual value signal for compensating the phase error. The amplified algebraic sign-corrected residual signal is thus included in the control in the main control circuit, thus also in the signal processing for creating the modulation signal or the phase resetting signal, respectively, and, above all, the rotation rate signal and finally the resetting signal for the phase modulator.

According to a further embodiment, the digital phase resetting signal can be created on the basis of the signal output of the adder in the case of a fiber-optic Sagnac interferometer by means of the main control circuit. It can further be supplied to the digital/analog converter for obtaining the resetting signal, which acts on the phase modulator.

This can be illustrated as follows. In the ideal case, the phase error itself is already known at the onset of the work cycle for a compensation of a phase error, which is created due to a quantization noise, in that the phase error is created or has an effect on the signal processing in the analog as well as in the digital domain, respectively. This is possible, because the phase error is determined for two work cycles, which follow one another immediately, by means of a residual value difference. Accordingly, the compensation of a previous phase error in the analog/digital converter data, read out in a later work cycle, is a particularly advantageous possibility to suppress the quantization noise. In the ideal case, the quantization noise is compensated completely, but a virtually perfect compensation appears in any event according to the above-described solution.

The matters described above can be summarized as follows, once again in a simplified manner. The modulation signal is computed in the evaluation circuit with a higher word width than the word width of the input of the digital/analog converter. The portions, which are surplus due to the difference of the word widths, thus quasi lower-value bits, which cannot be applied to the digital/analog converter, are assumed to be a remainder and the difference to the remainder created in the preceding gyroscope work cycle is formed. This difference is the above-described residual value difference, which corresponds to a phase error in response to the modulation. To determine the corresponding error of the analog/digital converter, this residual value difference is measured with the amplification of the entire analog path, thus the signal processing in the analog domain. The algebraic sign of the amplification is a function of that of the current modulation bit of the modulation signal in the evaluation circuit, so that the residual value difference is multiplied therewith. The corresponding amount of amplification can be obtained by means of an inverting or gain control element of the evaluation circuit and is accordingly a known variable of the signal processing due to measurements in the evaluation circuit, which run continuously. Finally, the correction obtained in this manner is added to the value or output signal, respectively, of the analog/digital converter in consideration of dead times, which typically appear in the non-ideal case. A phase error, which is traced back to a quantization noise, is thus always compensated to a virtually complete extent.

It is particularly advantageous that the residual value signal, which represents the phase error, is based on the signal portion of the signal comprising the first word width, which is not input into the digital/analog converter, thus on the signal portion, which represents the above-described residual signal comprising the third word width. This residual signal is not processed by means of the digital/analog converter and thus allows for a virtually unbiased conclusion to a phase error.

According to a method for controlling a fiber-optic Sagnac interferometer comprising a light source, a polarizer, a fiber coil, a photodetector device, an amplifier comprising an analog/digital converter connected downstream, a digital/analog converter, an evaluation circuit and an adder, two light beams, which originate from the light source, which are polarized by the polarizer and which are created by means of beam splitting, are irradiated into the fiber coil in opposite directions and subsequently recombined. The interference signal, which is created from the recombination of the light beams, is applied to the photodetector device after passing through the polarizer, wherein a signal, which corresponds to the light intensity of the interference signal and which is applied to the amplifier comprising the analog/digital converter connected downstream, the output signals of which are processed in the evaluation circuit, is supplied by means of the photodetector device. A digital phase resetting signal is created with the help of a main control circuit and is supplied to the digital/analog converter for obtaining a resetting signal which acts on the phase modulator. The output of the analog/digital converter and, thus, the output signals, which are processed in the main control circuit, as well as the phase resetting signal, thereby encompass a first word width. However, the input of the digital/analog converter and thus the resetting signal, which acts on the phase modulator, encompasses a second word width.

According to an embodiment of the method, the evaluation circuit, the analog/digital converter and the digital/analog converter operate in work cycles, which are predetermined and synchronized by means of a clock-pulse generator. The Sagnac interferometer thereby encompasses a residual value difference computing section for computing a residual value difference between the residual value signal of a first work cycle and the residual value signal of a subsequent work cycle. The residual value difference thereby encompasses the third word width, as it is formed from two residual value signals of different work cycles, which in each case encompass the third word width.

According to a further embodiment, the residual value difference is added to the output signal of the analog/digital converter via the adder, so that the corresponding resulting signal is processed in the evaluation circuit. The residual value difference is created from two different residual value signals, but can also be understood as a residual value signal. Even though the residual value difference does not represent a residual value signal, which can be assigned to a single work cycle, the residual value difference is created from residual value signals. A residual value difference can further be understood as a residual value signal for two consecutive work cycles.

While the invention has been described with reference to a presently-preferred embodiment, it is not limited thereto. Rather the invention is limited only insofar as it is defined by the following set of claims and includes within its scope all equivalents thereof.

What is claimed is:

1. A method for controlling a fiber-optic Sagnac interferometer, comprising a light source, a polarizer, a fiber coil, a photodetector device, an amplifier comprising an analog/digital converter connected downstream, a digital/analog converter, an evaluation circuit and an adder, wherein two light beams, which originate from the light source, which are polarized by the polarizer and which are created by means of a beam splitter, are irradiated into the fiber coil in opposite directions and are recombined subsequently, an interference signal, which is created from the recombination of the light beams, is applied to the photodetector device after passing through the polarizer, wherein a signal which corresponds to the light intensity of the interference signal and which is applied to the amplifier comprising the analog/digital converter connected downstream, the output signals of which are processed in the evaluation circuit, is supplied by means of the photodetector device, and wherein a digital phase resetting signal is created with the help of a main control circuit of the evaluation circuit and is supplied to the digital/analog converter for obtaining a resetting signal, which acts on the phase modulator, characterized in that:

the output of the analog/digital converter and thus the output signals, which are processed in the main control circuit, as well as the phase resetting signal, encompass a first word width, and the input of the digital/analog converter and thus the resetting signal, which acts on the phase modulator, encompasses a second word width, which is smaller than the first word width, with which the modulation and resetting signal are computed in the digital part of the main control circuit, wherein a residual value signal comprising a third word width, which can be added via the adder to the output signal of the analog/digital converter is created wherein this third word width corresponds to a number of surplus low-value bits, which are computed by the evaluation circuit but which cannot be applied to the digital/analog converter, because it only encompasses a limited, smaller word width.

2. The method according to claim 1, characterized in that the evaluation circuit, the analog/digital converter and the digital/analog converter operate in work cycles, which are predetermined and synchronized by means of a clock-pulse generator, wherein the Sagnac interferometer encompasses a residual value difference computing section for computing a residual value difference between the residual value signal of a first work cycle and the residual value signal of a further work cycle, wherein the residual value difference encompasses the third word width.

3. The method according to claim 1, characterized in that the residual value difference is added to the output signal of the analog/digital converter via the adder.

4. The method according to claim 2, characterized in that the residual value difference is multiplied with an algebraic sign of the current modulation signal, which is created in the evaluation circuit by means of a first multiplier, and that the algebraic sign-corrected residual value signal is multiplied with an amount of an amplification signal of an amplification control element of the evaluation circuit by means of a second multiplier, so that an amplified algebraic sign-corrected residual value signal is created, wherein the amount of the amplification signal can be created by inverting an output signal of the amplification control element.

5. The method according to claim 4, characterized in that a residual value difference adder adds the output of the analog/digital converter with the amplified algebraic sign-corrected residual value signal, so that the signal output of the adder can be processed in the main control circuit.

6. The method according to claim 5, characterized in that the digital phase resetting signal is created with the help of the main control circuit on the basis of the signal output of the adder and is supplied to the digital/analog converter for obtaining the resetting signal, which acts on the phase modulator.

7. A fiber-optic Sagnac interferometer comprising a light source, a polarizer, a fiber coil, a photodetector device, an amplifier comprising an analog/digital converter connected downstream, a digital/analog converter, an evaluation circuit, an adder and a phase modulator, wherein two light beams, which originate from the light source, which are polarized by the polarizer and which are created by means of a beam splitter are irradiated into the fiber coil in opposite directions and recombined subsequently and the two light beams are modulated by means of the phase modulator which is arranged in the fiber coil, an interference signal, which is created from the recombination of the light beams, is applied to the photodetector device, wherein a signal, which corresponds to the light intensity of the interference signal and which is applied to the amplifier comprising the analog/digital converter connected downstream, the output signals of which are processed in the evaluation circuit, are supplied by means of the photodetector device, and wherein a digital phase resetting signal is created with the help of a main control circuit of the evaluation circuit and is supplied to the digital/analog converter for obtaining a resetting signal, which acts on the phase modulator, characterized in that the analog/digital converter is embodied such that the output thereof and thus the output signals, which are processed in the main control circuit, as well as the phase resetting signal, encompass a first word width;

the digital/analog converter is embodied such that the input thereof and thus the resetting signal, which acts on the phase modulator, encompasses a second word width, which is smaller than the first word width, with which the modulation and resetting signal are computed in the digital part of the main control circuit, wherein a residual value signal comprising a third word width is created, which is added to the output signal of the analog/digital converter via the adder, wherein the residual value signal consists of surplus low-value bits of the signal comprising the second word width.

8. The fiber-optic Sagnac interferometer according to claim 7, characterized in that the evaluation circuit, the analog/digital converter and the digital/analog converter are embodied such that they operate in work cycles, which are predetermined and synchronized by means of a clock-pulse generator, wherein the Sagnac interferometer encompasses a residual value difference computation section for computing a residual value difference between the residual value signal of a first work cycle and the residual value signal of a further work cycle.

9. The fiber-optic Sagnac interferometer according to claim 8, characterized by a first multiplier for multiplying the residual value difference with an algebraic sign of the current modulation signal, which is created in the evaluation circuit.

10. The fiber-optic Sagnac interferometer according to claim 9, characterized by a second multiplier for multiplying the algebraic sign-corrected residual value signal with an amount of an amplification signal of an amplification control element of the evaluation circuit, so that an amplified algebraic sign-corrected residual value signal can be created.

11. The fiber-optic Sagnac interferometer according to claim 10, characterized by an inverter at the output of the amplification control element for creating the amount of the amplification signal by means of inverting the outputting signal of the amplification control element.

12. The fiber-optic Sagnac interferometer according to claim 10, characterized by a residual value difference adder for adding the output of the analog/digital converter with the amplified algebraic sign-corrected residual value signal, so that the signal output of the adder can be processed in the main control circuit.

13. The fiber-optic Sagnac interferometer according to claim 12, characterized in that
the main control circuit is embodied such that the digital phase resetting signal can be created on the basis of the signal output of the adder and
can be supplied to the digital/analog converter for obtaining the resetting signal, which acts on the phase modulator.

* * * * *